United States Patent
Nakamura

[11] Patent Number: 6,163,357
[45] Date of Patent: *Dec. 19, 2000

[54] LIQUID CRYSTAL DISPLAY DEVICE HAVING THE DRIVING CIRCUIT DISPOSED IN THE SEAL AREA, WITH DIFFERENT SPACER DENSITY IN DRIVING CIRCUIT AREA THAN DISPLAY AREA

[75] Inventor: Hiroki Nakamura, Kanagawa-ken, Japan

[73] Assignee: Kabushiki Kaisha Toshiba, Kanagawa-ken, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/938,819

[22] Filed: Sep. 26, 1997

[30] Foreign Application Priority Data

Sep. 26, 1996 [JP] Japan ...................................... 8-254962
Jun. 13, 1997 [JP] Japan ...................................... 9-156511

[51] Int. Cl.[7] .................................................. G02F 1/1339
[52] U.S. Cl. ............................................ 349/155; 349/151
[58] Field of Search ...................................... 349/151, 153, 349/155, 156

[56] References Cited

U.S. PATENT DOCUMENTS

| | | | |
|---|---|---|---|
| 3,967,882 | 7/1976 | Kubota et al. | 350/160 |
| 4,390,245 | 6/1983 | Shimizu et al. | 350/343 |
| 4,775,225 | 10/1988 | Tsuboyama et al. | 350/344 |
| 4,844,597 | 7/1989 | Katagiri et al. | 350/350 |
| 5,148,301 | 9/1992 | Sawatsubashi et al. | 359/80 |
| 5,338,240 | 8/1994 | Kim | 445/24 |
| 5,381,255 | 1/1995 | Ohnuma et al. | 359/68 |
| 5,537,235 | 7/1996 | Ishihara et al. | 359/81 |
| 5,566,013 | 10/1996 | Suzuki et al. | 359/81 |
| 5,739,888 | 4/1998 | Ogura et al. | 349/155 |
| 5,880,803 | 3/1999 | Tamai et al. | 349/156 |

FOREIGN PATENT DOCUMENTS 2-242230  9/1990  Japan .

Primary Examiner—Kenneth Parker
Attorney, Agent, or Firm—Pillsbury Madison & Sutro LLP

[57] ABSTRACT

A liquid crystal display element comprising drive circuits 56, 57 integrally formed with a drive element 31 on a substrate 32 and two substrates 32, 33 sealed by a sealing agent 67 to include a drive circuit formed portion with a seal area (120), wherein a spacer 66 for determining the gap between the substrates is not contained in a sealing agent but disposed in a display outside area (110). The gap between the electrode substrates is kept constant without damaging the drive circuit and small frame area, so that the liquid crystal device is made compact and lightweight.

11 Claims, 8 Drawing Sheets

LIQUID CRYSTAL DISPLAY DEVICE HAVING THE DRIVING CIRCUIT DISPOSED IN THE SEAL AREA, WITH DIFFERENT SPACER DENSITY IN DRIVING CIRCUIT AREA THAN DISPLAY AREA

BACKGROUND OF THE INVENTION

1. Field of the Invention

The invention relates to a liquid crystal display device, and more particularly to a liquid crystal display device integrated with a drive circuit in which the drive circuit is formed on a substrate where a pixel electrode is also formed.

2. Description of the Prior Art

Liquid crystal display devices which are of high density, high capacity, high function and high definition are being developed for practical use in these years. Among these liquid crystal devices, an active matrix type liquid crystal display device which has a thin-film transistor (TFT) as drive element is often used because high contrast display is obtained without any crosstalk between continuously disposed pixel electrodes, transmission display can be made, and a large size screen is made with ease.

As shown in FIG. 13, this display device comprises a first substrate 11 made of glass and a second substrate 12 made of glass which is disposed to oppose the first substrate 11 with a gap between them, and has a gap 15 for filling a liquid crystal layer 14 therein which is formed by placing a sealing agent on the peripheries of the substrates.

The area where the sealing agent 13 is disposed is a seal area (120), and the area surrounded by the seal area (120) comprises an image display area (100) and a display outside area (110) on the outer periphery of the image display area (100).

The areas other than the image display area, namely a seal area (120), a display outside area (110) and a seal area outer edge (140), are called a frame area (130).

A plurality of pixel electrodes are disposed in the form of matrix on the image display area (100) of the first substrate 11, and drive elements are connected to the respective electrodes.

Conventional active matrix substrates for the liquid crystal display device theretofore developed have an amorphous silicon thin-film transistor (hereinafter referred to as a-Si TFT) or a polysilicon thin-film transistor (hereinafter referred to as p-Si TFT) and have been placed on the market.

Among them, the p-Si TFT has a high-electron mobility therein, its drive element size can be made small as compared with the a-Si TFT, an aperture ratio of its pixel electrode can be improved, and its drive circuit is integrally formed on the active matrix substrate by the same p-Si TFT. Therefore, a drive IC which is separately produced and mounted is not needed, labor for its mounting process can be saved, and the device can be produced at a lower cost. Besides, since the frame area around the display area on the active matrix substrate can be made small, its development is promoted.

On the other hand, the liquid crystal display device needs the liquid crystal layer which has a uniform thickness through the entire area of the image display area for uniform displaying, and it is essential that two substrates have the same interval. Therefore, the gap between the substrates is controlled by means of a spacer by:

(1) dispersing microspherical spacer within the image display area, and
(2) mixing the spherical spacer or glass fiber having substantially the similar diameter into the sealing material for sealing the two substrates.

In the structure that the p-Si TFT is used to form the drive element of the pixel electrode and the same p-Si TFT is also used to integrally form the drive circuit of the drive element on the same electrode substrate, the position where the drive circuit is disposed with respect to the seal area is a problem.

The structure disposing the driving circuit on the outer periphery of the seal area has the glass substrate with a size larger than the seal area so to protrude from the seal area to secure the disposition area where the drive circuit is formed. Therefore, it is hard to make the display cell small.

Japanese Patent Laid-Open Publication No. Sho 62-251723 indicates that reliability is questionable because the liquid crystal layer is disposed on the drive circuit.

Therefore, it is proposed to dispose the drive circuit on the seal area (U.S. Pat. No. 5,148,301). This structure effectively uses the seal area and is suitable to make the liquid crystal cell small. But, it has a disadvantage that a yield in production is lowered because the spacer for controlling the cell thickness is used as the sealing agent to be disposed on the drive circuit.

Furthermore, where the drive circuit is disposed on a single row side and a single column side on the outer periphery of the display area of a rectangular active matrix substrate, when a sealing means is disposed on the drive circuit of the outer periphery of the display area to surround it, the cell thickness restricted by the spacer, e.g., the glass fiber, is different for a height of the drive circuit between a side where the drive circuit is disposed and a side where no drive circuit is disposed to oppose the former drive circuit, the gap between the substrates becomes uneven, and display becomes defective. In this connection, Japanese Patent Publication No. Hei 2-242230 proposes to dispose a pseudo drive circuit pattern having the same height as the drive circuit on the side where no drive circuit is disposed. By forming the pseudo drive circuit pattern, variations in cell thickness can be lowered even when the sealing means is disposed on the drive circuit. But, a yield of the drive circuit is lowered similarly as in the above case when a cell thickness controlling member such as glass fiber is used.

In a conventional liquid crystal display device integral with the drive circuit using the p-Si TFT as drive element, as to the seal area of the sealing agent for bonding the active matrix substrate and the opposed substrate, the drive circuit on the active matrix substrate is disposed on the frame area of the substrate or the outer periphery of the drive circuit.

Accordingly, even though the drive circuit is integrally formed with the active matrix substrate, the frame area around the display area becomes large. Besides, a liquid crystal display device using them is prevented from being made small, and a plurality of liquid crystal display panels cannot be arranged in close proximity to one another, so that a folding-type liquid crystal display device or a large-size liquid crystal display device cannot be made. With the structure having the drive circuit disposed on the seal area, the drive circuit is damaged by the glass fiber contained in the sealing agent to restrict the cell thickness, or the cell thickness becomes uneven depending on the presence or not of the drive circuit. Besides, since the glass fiber contained in the sealing agent is rigid and does not deform, a lead line of the signal line or scanning line running through the seal area to reach from the display area to the drive circuit might be broken by being compressed by the glass fiber, resulting in a failure.

SUMMARY OF THE INVENTION

Accordingly, one object of the present invention is to remedy the above disadvantages and to reduce the size of a frame area on the outer periphery of a display area of a liquid crystal display device which is integrated with a drive circuit, and to obtain a compact and lightweight liquid crystal display device and to provide a liquid crystal display device having good display quality by uniformizing the liquid crystal cell thickness.

Besides, another object of the invention is to provide a liquid crystal display device which becomes inexpensive by improving a yield when the liquid crystal cell is produced by preventing a defective part from being made due to a breakage in a drive circuit, signal line or lead line due to the spacer for controlling the cell thickness.

To achieve the above objects, pursuant to one aspect of the invention, there is provided a liquid crystal device in which:

a first substrate and a second substrate are mutually opposed with a gap therebetween and the gap is surrounded by a sealing member to dispose a liquid crystal layer therein;

the sealing means is positioned in a seal area, a gap area surrounded by the seal area comprises an image display area and a display outside area formed on the outer periphery of the image display area, the first substrate has a plurality of pixel electrodes disposed in the form of matrix in the image display area, a drive element is connected to the respective pixel electrodes, and a drive circuit for driving the drive element is disposed in at least the seal area; and the second substrate has an opposed electrode on at least the image display area, and a spacer for keeping the gap between the first substrate and the second substrate; wherein the spacer is substantially not disposed in the seal area but disposed on at least either the display outside area or the image display area.

The liquid crystal display device as set forth above has the spacer disposed only in the display outside area.

The preferred embodiments of the invention includes the following:

The liquid crystal display device as set forth above has a part of the spacer disposed in the form of a strip along the display outside area.

The liquid crystal display device as set forth above has a part of the spacer contacted with the sealing means.

The liquid crystal display device as set forth above has the spacer disposed in the image display area and the display outside area, and the spacer has a different density between the image display area and the display outside area.

The liquid crystal display device as set forth above has at least one of the first electrode substrate and the second electrode substrate provided with a shielding area, the image display area has a shielding area, and the spacer is selectively disposed in the shielding area.

The liquid crystal display device as set forth above has the spacer made of at least one of column, prism and strip shapes or a combination thereof.

The liquid crystal display device as set forth above has the spacer made of a transparent member.

The liquid crystal display device as set forth above has the spacer formed of multilayered colored layers.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 9b is a sectional view taken along line A—A of FIG. 9a;

FIG. 10b is a partly expanded sectional view of FIG. 10a;

FIG. 13b is a plan view of FIG. 13a.

DESCRIPTION OF THE PREFERRED EMBODIMENTS

Figure 1:
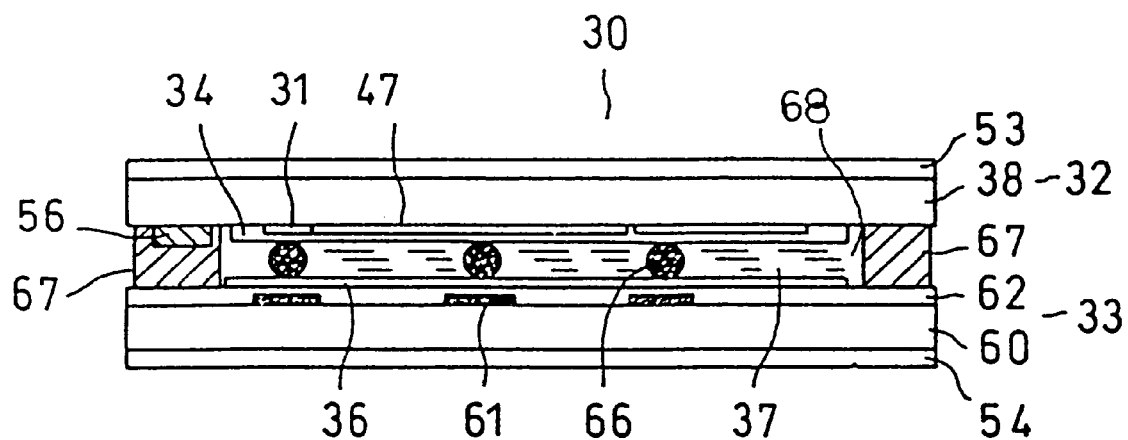
FIG. 1 is a sectional view illustrating Embodiment 1 of the invention.

Hereinafter, several aspects and embodiments of a liquid crystal display device according to the present invention will be described with reference to the according drawings, wherein like numerals designate identical or corresponding parts in the Figures.

The invention relates to a liquid crystal display device containing an image display area and a frame area in which the frame area is positioned on the outer periphery of the image display area as described above and comprises a display outside area common to the image display area and a liquid crystal layer, a seal area, and a seal area outside area of the seal area.

An active matrix substrate comprises a pixel electrode containing a drive element in an image display area, a lead line of scanning lines and signal lines connected to the drive element on the display outside area, a drive circuit having the scanning lines and the signal lines connected on the seal area, and a seal area outer edge if required. Thus, the drive circuit is formed on the seal area, and a part of the drive circuit can be disposed on the display outside area as required. But, the spacer is not disposed on the seal area but mainly disposed on the display outside area.

Besides, the spacer may be disposed on the image display area but selectively in a shielding area so as not to effect on an aperture ratio.

By forming the liquid crystal cell with a gap to be formed between the active matrix substrate and an opposed substrate surrounded by the bonding area containing the drive circuit by means of a sealing means which does not contain a control means for controlling the gap thickness, the frame area on the outer periphery of the seal area is made small without lowering a yield due to a damage in the frame area by the control means, thereby making the liquid crystal display device small and lightweight. Besides, by reducing a joint area size, a plurality of liquid crystal display devices are arranged in close proximity to form a large screen display device or a multi-screen display device.

Furthermore, the invention uniformizes a gap between the active matrix substrate and the opposed substrate regardless of the presence or not of a drive circuit in the seal area of the seal means and improves display image quality.

(Embodiment 1)

Embodiment 1 of the invention will be described with reference to FIG. 1 through FIG. 4. An active matrix type liquid crystal display panel 30 has an active matrix substrate 32 which is a first electrode substrate using a p-Si TFT 31 as drive element and an opposed substrate 33 which is a second electrode substrate. Between these substrates, a nematic liquid crystal 37 which is a liquid crystal composition is held through aligned films 34, 36 made of polyimide, and these substrates also have polarizers 53, 54. The active matrix substrate 32 has the p-Si TFT 31 on a glass substrate 38. The p-Si TFT 31 is formed by the following procedure.

Figure 2:
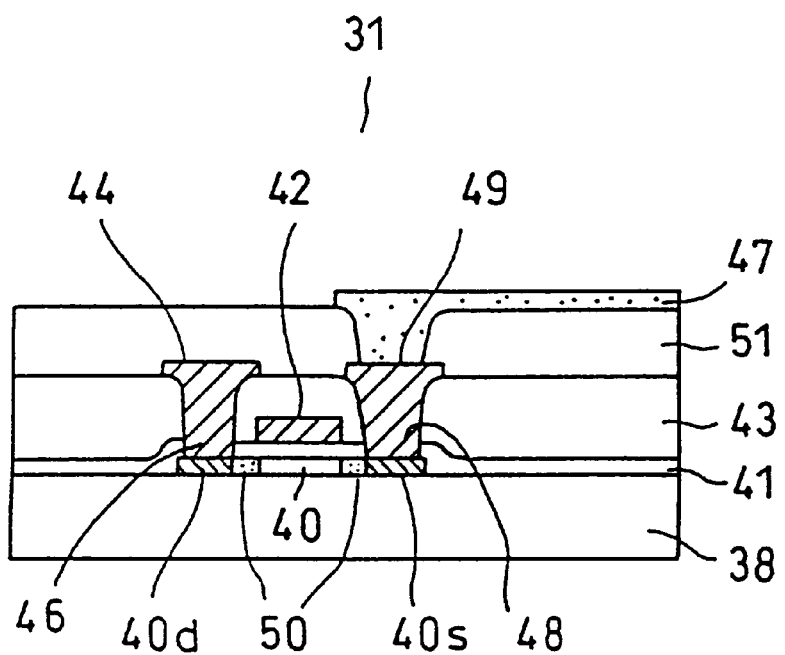
FIG. 2 is a sectional view showing a drive element shown in FIG. 1.

As shown in FIG. 2, an amorphous silicon (hereinafter referred to as a-Si) film is formed on the glass substrate 38 by a CVD method. Then, the a-Si film is formed into a polycrystalline silicon (hereinafter referred to as p-Si) film by a laser annealing method and patterned into a semiconductor layer 40 having the shape of a matrix.

The semiconductor layer 40 is then coated with a first insulating layer 41 as gate insulating film. And, a scanning line (not shown) which applies a scanning signal to the p-Si TFT 31 and a gate electrode 42 which is a part of the scanning line and applies a gate voltage are formed. Then, dopant is implanted into the semiconductor layer by self-aligning to form a source area 40s and a drain area 40d, and a second insulating layer 43 is coated thereon.

Where the p-Si TFT 31 is formed of an n-channel transistor, a low dopant concentration area (n⁻ area) 50 is preferably formed between an active layer and a source and drain area to configure an LDD (Lightly Doped Drain) structure, so that the dopant implantation into the n⁻ area is performed independent of the source and drain area. A scanning line drive circuit 56 and a signal line drive circuit 57 (FIG. 3) to be described afterward are desired to have n-channel and p-channel CMOS structures, and the implantation of dopant is separately performed for the n channel and the p channel in order to form the source area 40s and the drain area 40d.

Then, a signal line 44 for applying an image signal to the p-Si TFT 31 is patterned and connected to the drain area 40d through a first contact hole 46, and the same material as the signal line 44 is also connected to the source area 40s through a first contact hole 48. A third insulating layer 51 is formed on them to connect the source area 40s and a pixel electrode 47 formed of indium-tin oxide (hereinafter referred to as ITO) through a second contact hole 49, thereby forming a matrix pattern.

Figure 3:
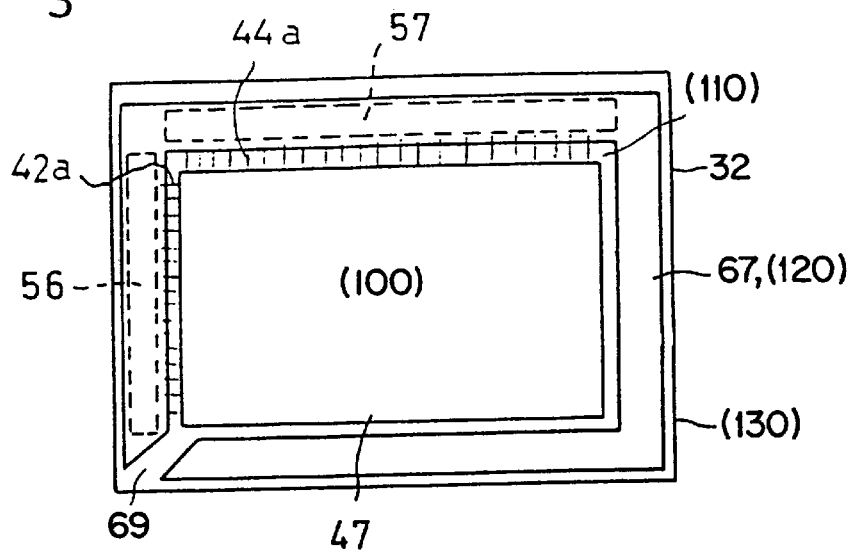
FIG. 3 is a plan view illustrating Embodiment 1 of the invention.

As shown in FIG. 3, the scanning line drive circuit 56 which is connected to a lead line 42a of the scanning line 42 and the signal line drive circuit 57 which is connected to a lead line 44a of the signal line 44 are formed on two sides which are next to an image display area (100) on which many pixel electrodes 47 on the active matrix substrate 32 are disposed in the form of matrix. The drive circuit has a height of 1 to 2 $\mu$m substantially equal to that of the image display area having pixels on it.

Figure 4:
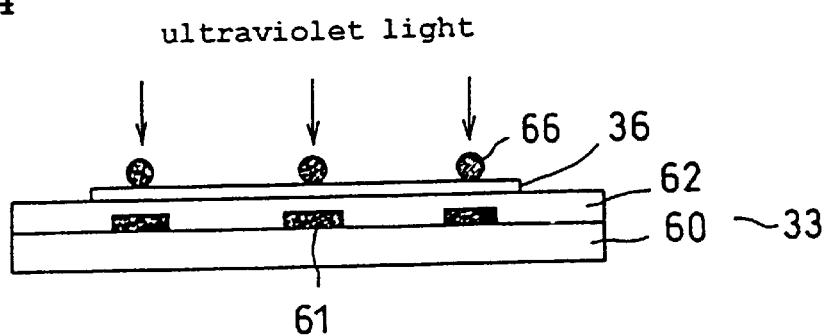
FIG. 4 is a sectional view illustrating a production method of Embodiment 1 of the invention.

On the other hand, as shown in FIG. 1 and FIG. 4, the opposed substrate 33 has a shielding member of chromium (Cr) or the like formed as film on a glass substrate 60 and patterned into the form of matrix so to oppose the p-Si TFT 31 on the active matrix substrate 32 to form a shielding layer 61, and a clear opposed electrode 62 made of an ITO is formed on the front surface by sputtering. If a color filter for a projector or the like is not needed, the opposed electrode 62 may be formed on the shielding layer 61 as described above. If a color filter is used for displaying, the opposed electrode may be formed after forming the shielding layer and a color filter layer consisting of green, blue and red. And, the shielding layer is not limited to a metal layer of Cr or the like but may be an organic layer such as a black resist.

Successively, the aligned films 34, 36 made of polyimide are coated by printing onto the active matrix substrate 32 and the opposed substrate 33 on the sides of the pixel electrode 47 and the opposed substrate 62 respectively as shown in FIG. 1.

A photo-setting ink and a silica spacer 66 which is a cell thickness controlling means and has a compressive modulus of 7500 kg/mm$^2$ under 10% deformation are selectively disposed above the shielding layer 61 which is a shielding area excepting openings of the opposed substrate 33 by a flexure printing method capable of printing with high precision. Then, ultraviolet light is irradiated from the side of the silica spacer 66 as shown in FIG. 4 to fix the silica spacer 66 onto the aligned film 36. A liquid crystal layer has a thickness of 5 $\mu$m, for example.

On one hand, as to the active matrix substrate 32, an ultraviolet hardening sealing agent 67 is applied by printing to a seal area (120) including the scanning line drive circuit 56 and the signal line drive circuit 57 excepting a liquid crystal filling hole 69 by means of a dispenser. Then, the opposed substrate 33 is placed on and aligned with the active matrix substrate 32, these substrates 32, 33 are compressed so to have a uniform gap 68 between them, and ultraviolet light is irradiated to harden the sealing agent 67 to form a liquid crystal cell. A disposing density of the silica spacer on a display outside area (110) in contact with the seal area (120) is higher than that of the image display area (100).

Then, a nematic type liquid crystal is filled into the gap of the liquid crystal cell through the liquid crystal filling hole 69 to form the liquid crystal layer 37. And the liquid crystal filling hole 69 is sealed. The polarizers 53, 54 are mounted on the substrates 32, 33 to complete the liquid crystal display panel 30.

The liquid crystal display panel 30 formed above is used to form a small and lightweight liquid crystal display device.

By configuring as described above, the seal area (120) is disposed in position of the drive circuits 56, 57 adjacent to the image display area (100), and a frame area (130) around the display area of the active matrix substrate 32 can be made very small. Since the liquid crystal display device can be made small and lightweight, it can be applied to a portable information terminal or the like. And, even when a plurality of liquid crystal display panels are disposed side by side, their joints can be narrowed. Accordingly, a large size liquid crystal display device or the like can be made of them.

Among four sides which are surrounded by the seal area (120), the drive circuits 56, 57 are formed on two sides only and no drive circuit is formed on the remaining two sides, but control of the silica spacer 66 for its thickness is unquestioned if it is present in the neighborhood, e.g., within 2 mm, of the sealing agent, or mainly on the display outside area (110).

Besides, when the drive circuit is disposed on the seal area of all sides, control of the thickness is further unquestioned. In this embodiment, since the silica spacer 66 is orderly arranged on the shielding layer 61 of the image display area, its thickness control can be made more accurately.

Furthermore, since the silica spacer as spacer for controlling the cell thickness is disposed to be surrounded by the sealing agent only, the cell thickness can be made uniform on the front surface of the seal area regardless of the presence or not of the drive circuits 56, 57 on the seal areas around the display area, so that display image quality is uniform and good.

In addition, since a gap controlling means such as glass fiber is not contained in the sealing agent 67, even if the disposed positions of the drive circuits 56, 57 adjacent to the image display area are determined to be the seal area (120) while the liquid crystal cell of the liquid crystal display panel 30 is being formed, the drive circuits 56, 57 are not damaged by being pressed by the glass fiber unlike prior art, improving a yield in forming the liquid crystal cell. Thus, a liquid crystal display device using the liquid crystal display panel 30 can be made inexpensively.

If this seal area (120) has the drive circuits 56, 57 which have a width larger than that of the sealing agent 67, they may be disposed to overlap at least partly, and it is to be understood that since I/O lines to and from the drive circuits are generally disposed on the outer periphery of the drive circuits, the sealing agent may be disposed on the drive circuits including them.

In addition, the silica spacer 66 in the form of a microsphere is not disposed on openings of the image display area 47 which light passes through but selectively disposed on the shielding layer 61. Therefore, alignment in the neighborhood of the silica spacer 66 is not disturbed or a displaying property is not degraded due to light permeation of the silica spacer 66 itself, so that remarkable display image quality can be obtained.

If the silica spacer 66 disposed in the seal area (120) in Embodiment 1 of the invention is not in a portion corresponding to the drive circuit which is in the seal area, the effect of the invention can not be obtained.

In Embodiment 1, only the silica spacer is disposed in the image display area, but it is to be understood that the silica spacer and a plastic spacer may be disposed in a mixed form as spacer. In this case, the plastic spacer desirably has a diameter equal to or larger than the silica spacer. Thus, control can be made so that a final cell thickness is determined according to the silica spacer with the plastic spacer having the same diameter and a larger deviation being compressed.

Even if a particle diameter is identical, a deviation in particle diameter of the silica spacer is ±0.05 μm with respect to an average particle diameter of 5 μm, while that of the plastic spacer is ±0.3 μm. Therefore, the plastic spacer has higher possibility of being deformed. A ratio between them depends on the display size or the disposing density but may be in a range of 1:1 to 1:100=silica:plastic, and preferably in a range of about 1:3 to 1:30.

Mixing of a conductive substance into the sealing agent 67 has an effect of shielding the drive circuits 56, 57 from undesired electromagnetic waves coming from outside. In this case, microspheres of Al, Ti, carbon or the like having a maximum diameter of 1 μm may be added to the sealing agent in a ratio of 1 to 5%.

(Embodiment 2)

Figure 5:
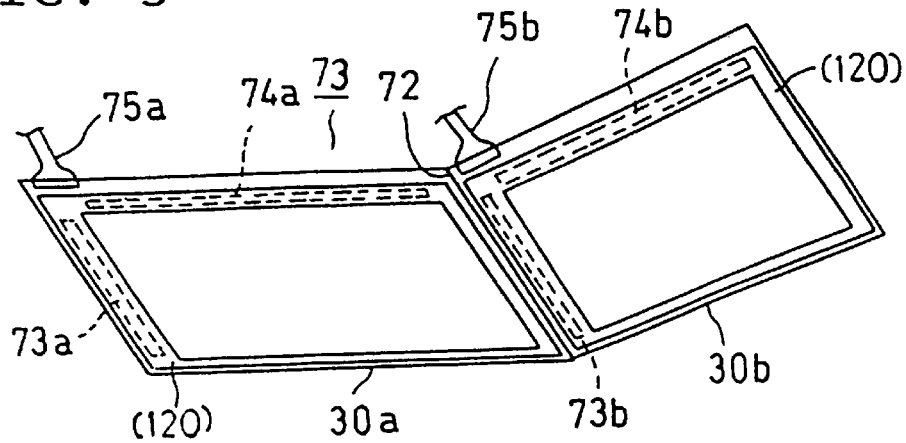
FIG. 5 is a perspective view illustrating Embodiment 2 of the invention.

Embodiment 2 of the invention will be described with reference to FIG. 5. In this embodiment, the liquid crystal panel 30 of Embodiment 1 is used in multiple numbers and modularized into a folding type liquid crystal display device.

Specifically, two of the liquid crystal display panel 30 of Embodiment 1 are joined to form a folding type liquid crystal display device 73. I/O lines 75a, 75b to scanning line drive circuits 73a, 73b and signal line drive circuits 74a, 74b disposed in the seal area (120) are formed at the upper part of first and second liquid crystal display panels 30a, 30b.

The seal area of the first liquid crystal display panel 30a and the seal area overlapping with the scanning line drive circuit 73b of the second liquid crystal display panel 30b are present on a joint 72 between the liquid crystal display panels 30a and 30b. Actually, when the seal areas of the liquid crystal display panels 30a, 30b are 0.8 mm for example, the liquid crystal display panels 30a, 30b have their circumferences made of a silicon member and joined, the joint 72 can be formed into a very narrow width of about 3 mm.

(Embodiment 3)

Figure 6:
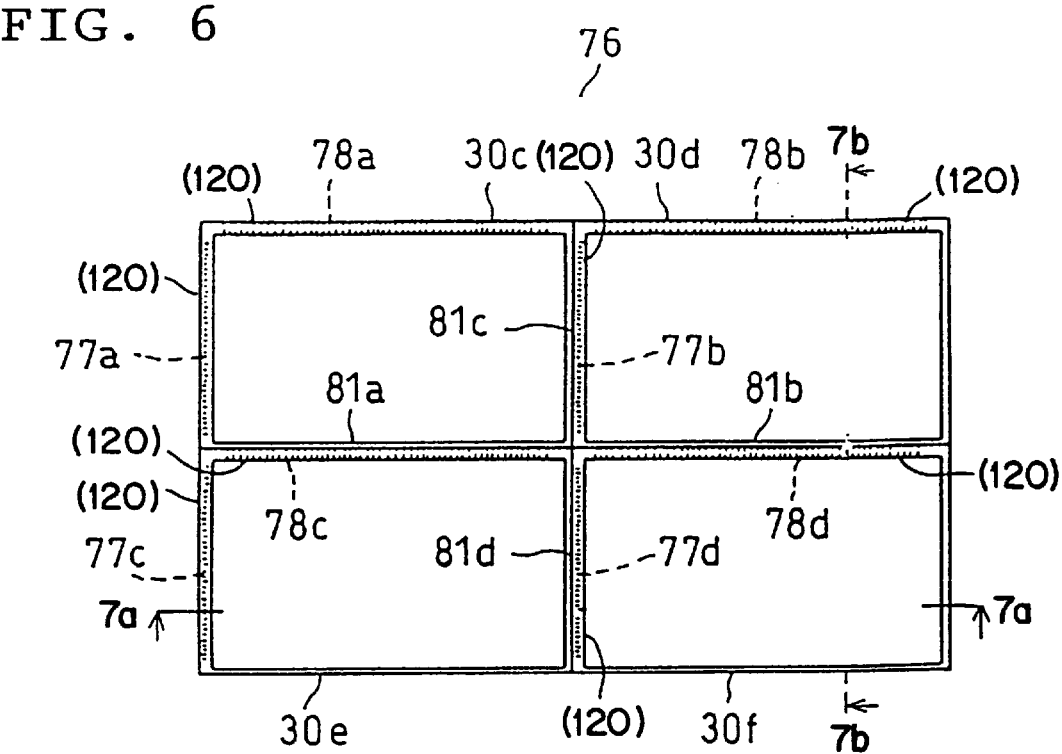
FIG. 6 is a plan view illustrating Embodiment 3 of the Invention.
Figure 7A:
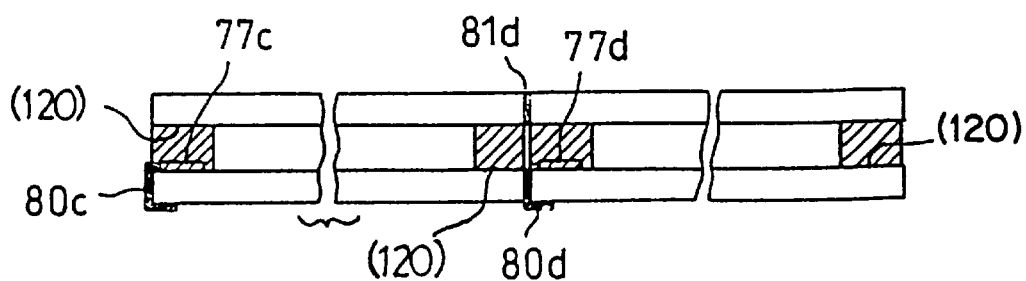
FIG. 7a is a sectional view taken along line A—A of FIG. 6.
Figure 7B:
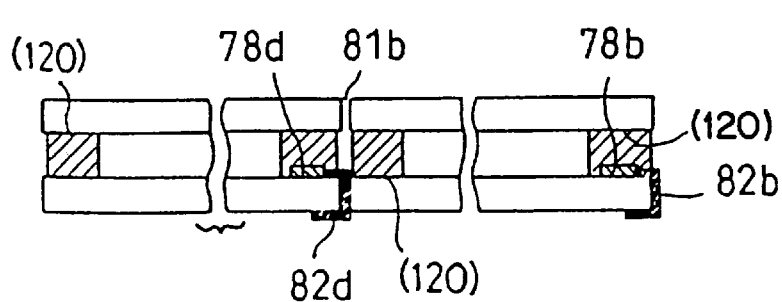
FIG. 7b is a sectional view taken long line B—B of FIG. 6.

Embodiment 3 of the invention will be described with reference to FIG. 6 and FIG. 7. In this embodiment, the liquid crystal panel 30 of Embodiment 1 is used in multiple numbers and modularized into a large size liquid crystal display device.

Specifically, four of the liquid crystal display panel 30 of Embodiment 1 are joined to form a large size liquid crystal display device 76. I/O lines 80c, 80d to scanning line drive circuits 77a to 77d and I/O lines 82c, 82d to signal line drive circuits 78a to 78d disposed in the seal area (120) are formed by forming a conductive pattern made of a polymer type copper paste, wiring to the back face, e.g., 38c and 38d, through end faces of respective liquid crystal display panels 30c to 30f, and connecting to an I/O device on the back face. It is to be understood that a protective film is desirably formed on the wired end surface of the substrate to protect from being damaged.

Accordingly, only the I/O lines 80c, 80d, 82c, 82d having a very small thickness of about 0.5 mm are present in addition to the seal area (120) on joints 81a to 81d of the liquid crystal display panels 30c to 30f, so that these joints can be formed very narrow.

By configuring as described above, the joints 72, 81a to 81d of the respective large size display devices 73 (FIG. 5), 76 (FIG. 6) formed of the multiple liquid crystal display panels 30 can be formed narrow, and the joints do not disturb displaying an image, so that display image quality can be improved.

Figure 8:
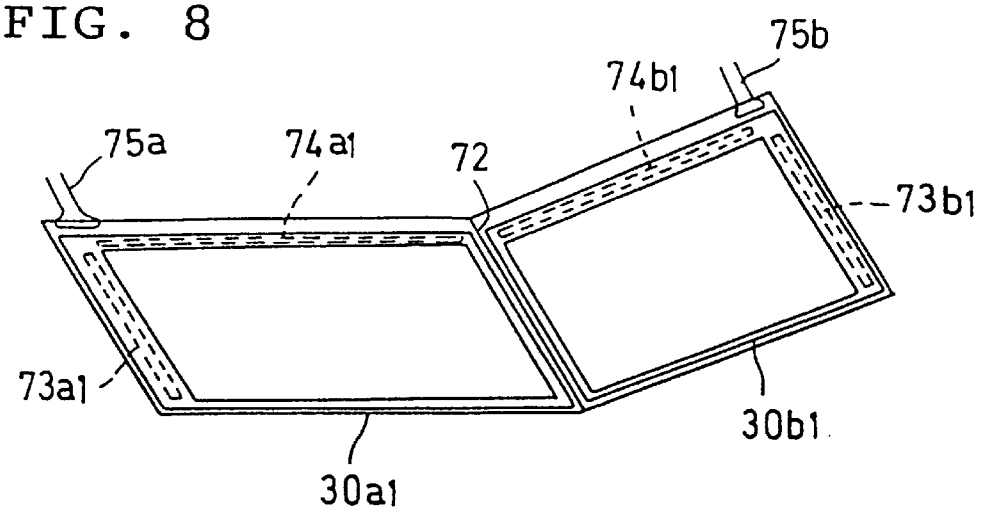
FIG. 8 is a perspective view showing a modified embodiment of Embodiment 2.
Figure 9A:
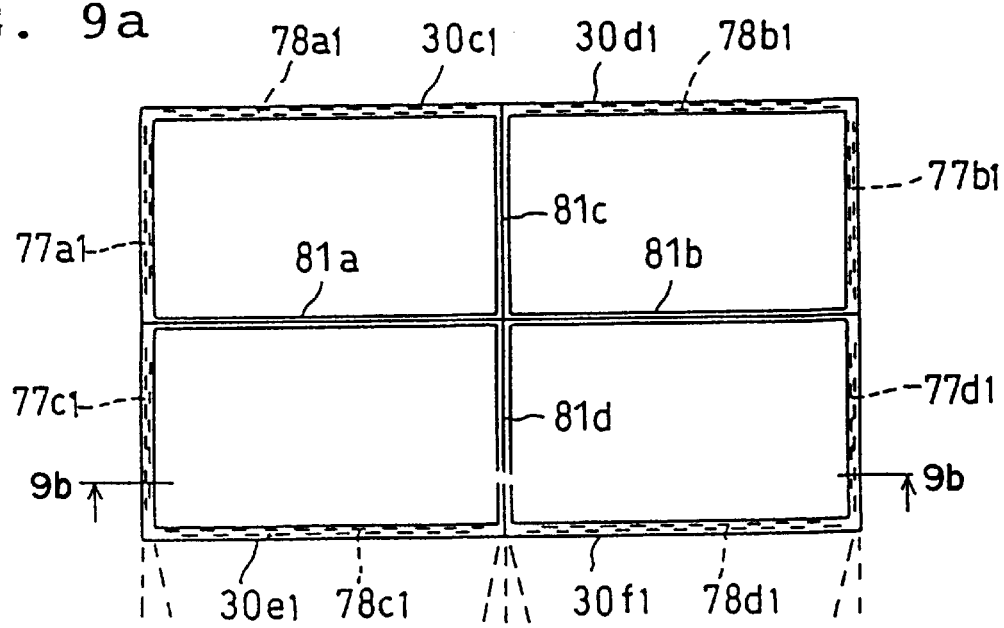
FIG. 9a is a plan view showing a modified embodiment of Embodiment 3.
Figure 9B:
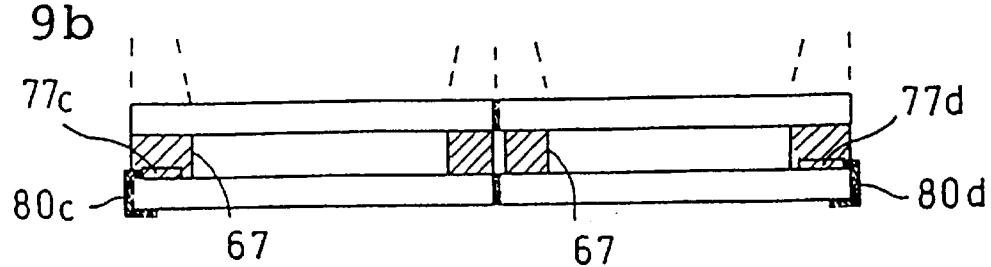

As far as the structures using the liquid crystal display panel in two and four as in Embodiment 2 and Embodiment 3 are concerned, for example when the two are used as in Embodiment 2, I/O connection portions 73a1, 73b1, 74a1, 74b1 may be formed at right and left sides and upper and lower sides of liquid crystal display panels 30a1, 30b1 as in Modification 1 (modification of Embodiment 2) shown in FIG. 8. And, when the four are used, I/O connection portions 77a1 to 77d1, 78a1 to 78b1 can be disposed at right, left, upper and lower sides of liquid crystal display panels 30c1, 30d1, 30e1, 30f1 to connect outside the faces where the four panels are contacted as in Modification 2 (modification of Embodiment 3) as shown in FIG. 9. However, the structures described above are essential when five panels or more are used.

In Modification 1 and Modification 2, since the same panel can not be used for the liquid crystal display panels 30a1, 30b1 on right and left sides in Modification 1 for example, two types of panels having the drive circuit on a different position are needed, so that it is disadvantageous that productivity can not be improved and production costs cannot be reduced.

(Embodiment 4)

Figure 10A:
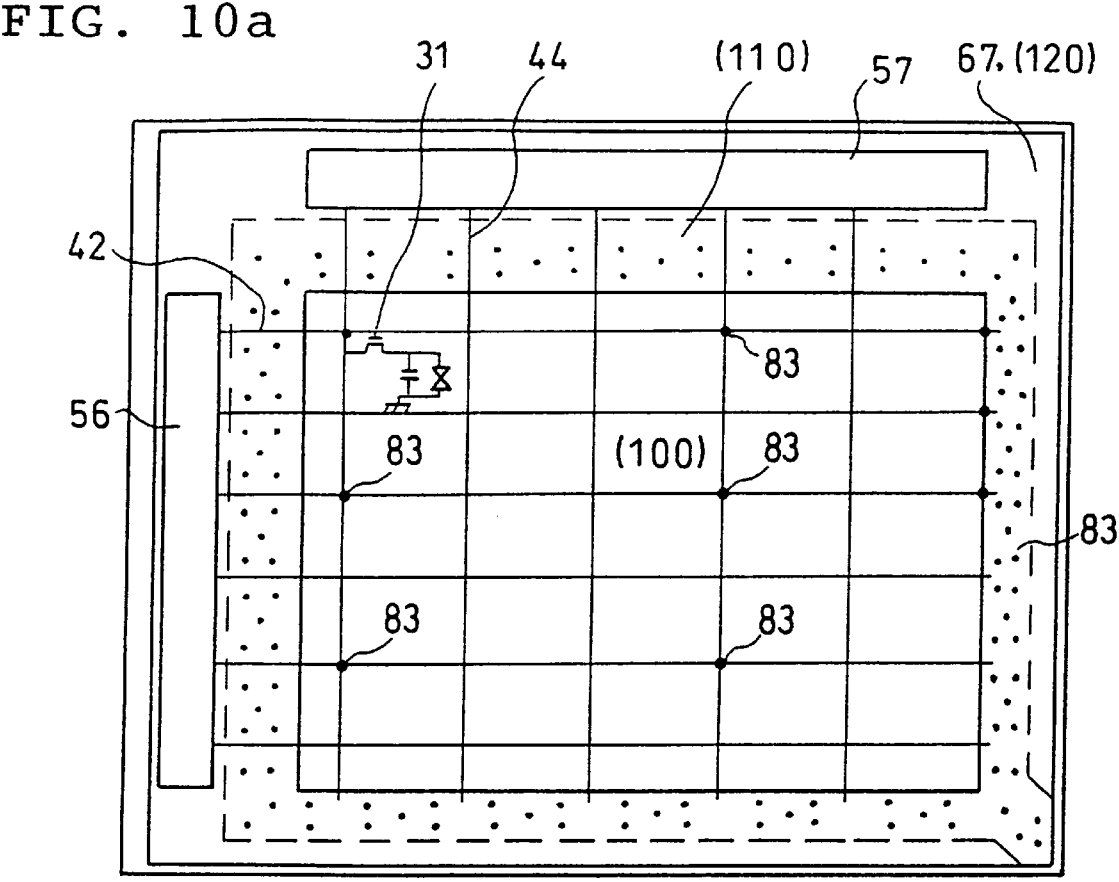
FIG. 10a is a plan view illustrating Embodiment 4 of the invention.
Figure 10B:
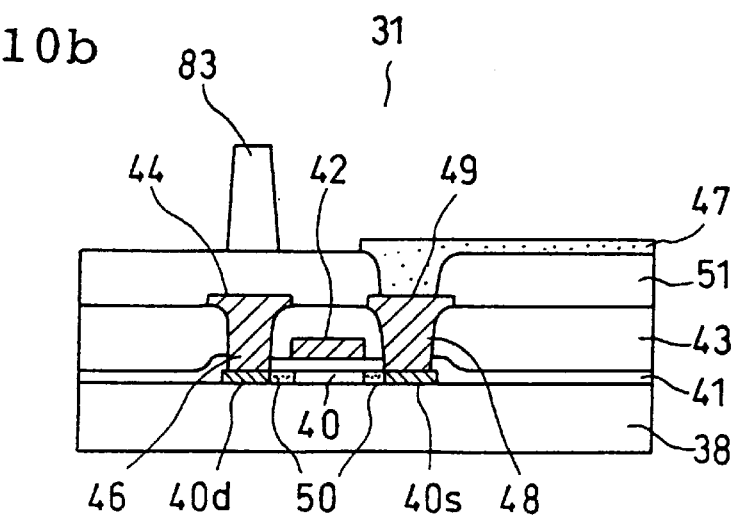
Figure 13A:
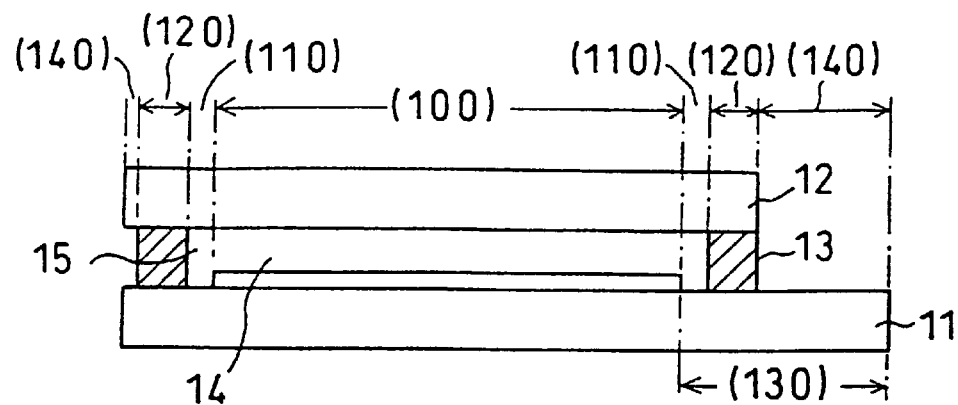
FIG. 13a is a sectional view showing the structure of a liquid crystal display device.
Figure 13B:
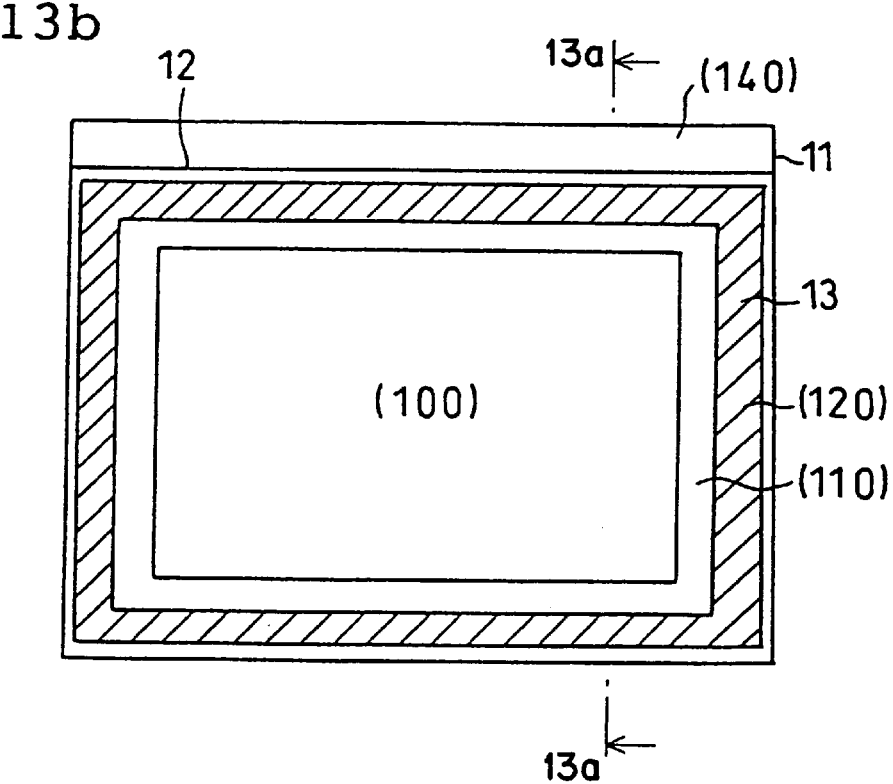

FIG. 10 shows another embodiment of the invention in which dot columnar spacers 83 are disposed on an image display area (100) which is formed of pixels disposed in the form of matrix and also on a display outside area (110) between the image display area (100) and a seal area (120). A dot-shaped spacer made of a photo-sensitive acrylic resin is formed of a positive photo-sensitive acrylic resin on the active matrix substrate having the p-Si TFT formed on it as shown in FIG. 13 (a) in the same way as Embodiment 1. Like reference numerals designate like parts in FIG. 1 and FIG. 2.

Specifically, the display outside area (110) is positioned between the image display area and the drive circuits 56, 57, and it is an area extended from scanning lines 42 and signal lines 44 in the image display area (100) and also on the way that they are connected to the drive circuits. Reference numeral 31 denotes a drive element TFT of a single pixel. It is desirable that a spacer is disposed between lead lines. For one-sided driving having the drive circuit on one side of the display, the spacer is preferably disposed outside of the display area where the drive circuit is not disposed. By making spacer arrangement density on the display outside area (110) higher than that on the image display area (100), width of the substrate gap can be made constant without mixing the spacer into the sealing agent.

After the sealing agent 67 is applied by a screen printing method or a dispensing method, a substrate with the switching matrix and an opposed substrate are overlaid mutually and the applied sealing agent 67 is spread wider than when it was applied. Therefore, even if the seal area is disposed on the drive circuit, it is necessary to dispose an area free from the sealing agent between the seal area and the image display area (100) with variations in the production taken into account. By disposing the spacer for controlling the cell thickness on the display outside area, the liquid crystal panel can be formed without damaging the drive circuit. To form dummy pixel rows or columns in an area outside of the image display area (100), they may be formed in the display outside area.

(Embodiment 5)

Figure 11:
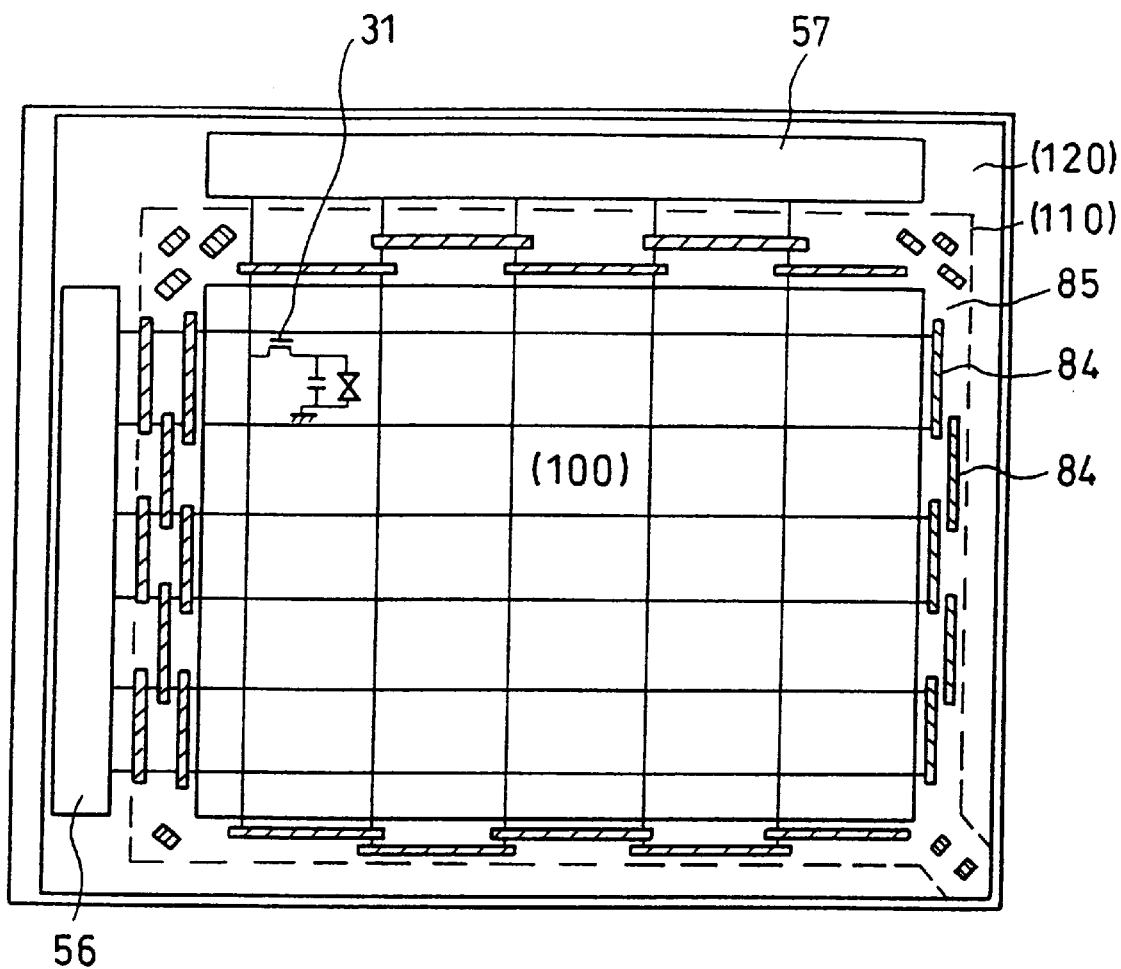
FIG. 11 is a plan view illustrating Embodiment 5 of the invention.

FIG. 11 shows that wall-type spacers 84 which are not dot-shaped but long are disposed with an appropriate gap 85 between them in the display outside area (110) which is formed between the seal area (120) and the outer periphery of the image display area (100) and along the periphery of the image display area.

To form spacer columns as spacer in the display outside area, flexibility of selecting the shape, size and material of the spacer is high. Especially, to form columns in the display outside area, effects on alignment of liquid crystal are not required to be so carefully considered than when they are formed in an effective display area, so that various types of forms are available. In addition, the columns may be designed so as not to cause a problem in injecting or aligning liquid crystal.

(Embodiment 6)

Figure 12A:
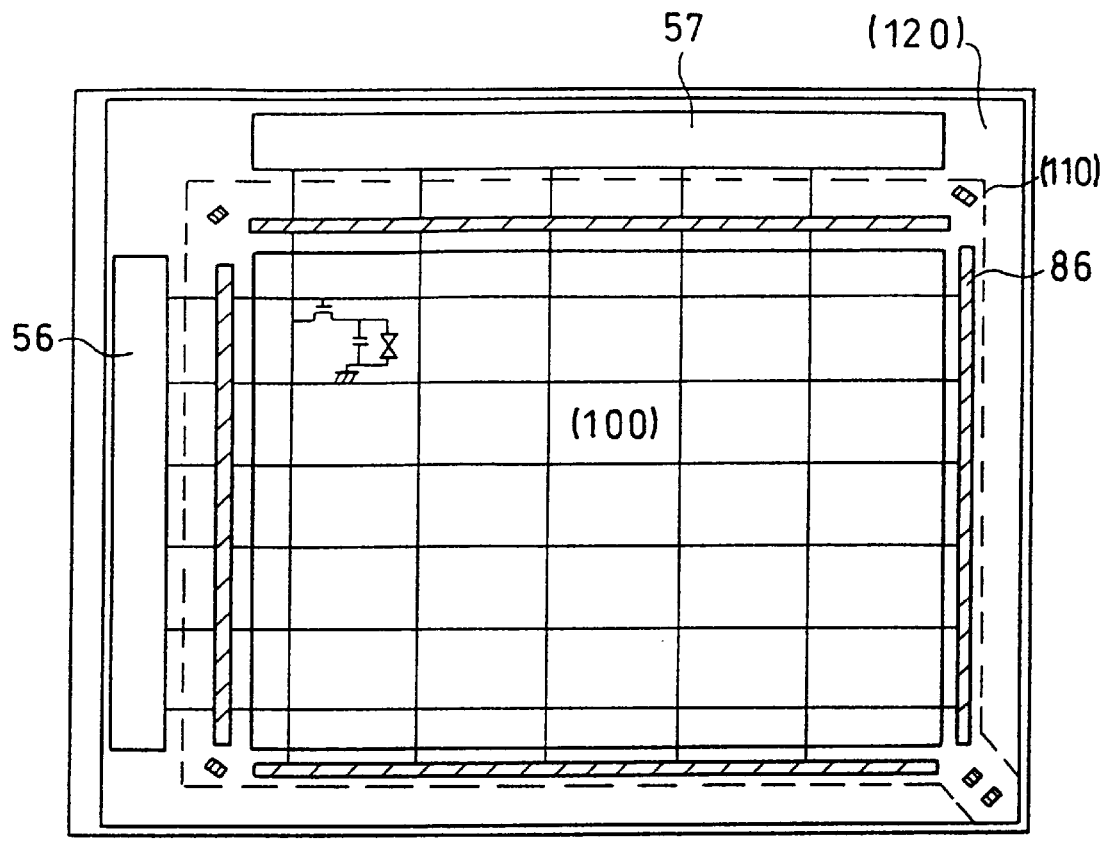
FIG. 12a is a plan view illustrating Embodiment 6 of the invention.

As shown in FIG. 12(a), this embodiment has strip spacers 86 disposed on the display outside area (110). Four corners are open to allow liquid crystal to flow. These openings serve to prevent a sealing agent 67 from protruding toward the image display area (100) when a first substrate and a second substrate are overlaid.

Figure 12B:
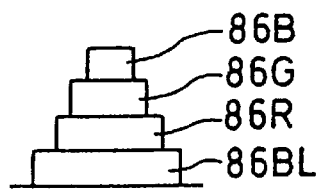
FIG. 12b is an expanded sectional view showing a modified type of the spacer of Embodiment 6.

In FIG. 10 to FIG. 12, the columnar and wall-type spacers were formed in a single layer on the active matrix substrate but may be formed into a multilayered structure or in the form of an opposed substrate. When it is formed into the multilayered structure and a color filter is disposed in the image display area, two or more color filters among red, green, blue and black filters can be laminated as spacer. FIG. 12(b) is an expanded sectional view showing that a red layer 86R, a green layer 86G, a blue layer 86B and a black layer 86BL are laminated.

Figure 12C:
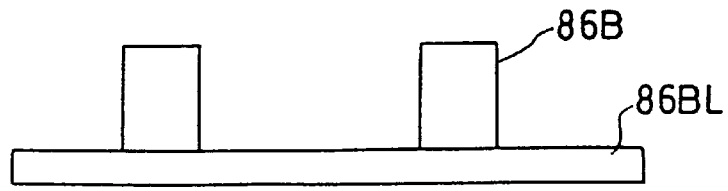
FIG. 12c is an expanded sectional view showing another modified type of the spacer of Embodiment 6.

The spacer in the image display outside area has a two-layered structure of the blue layer 86B and the black layer 86BL as shown in FIG. 12(c), and the bottom layer 86BL may be formed commonly and continuously in the spacer.

Besides, the bottom layer may be continued or combined with another member and continued to cover the drive circuit to be disposed on the bottom layer. And, the spacer may be transparent but preferably made of a translucent member in a single layer or multilayers to distinguish the image display area from its circumference or to shield the drive circuit. In other words, it is desired to have a structure to surround the circumference along the sealing agent using at least a part of the spacer so as to continuously surround the outside of the display area.

A peripheral area of the image display area may have a gap controlling spacer structure, but to dispose a color filter on the image display area, two or more color layers among red, green and blue color layers may be laminated to form the spacer.

The spacer column structure between the image display area and the seal area has an effect of preventing or limiting the sealing agent from spreading toward the display area when the cell is formed by laminating two substrates. Therefore, it is also effective in relieving seal printing precision, controlling a final seal width, and decreasing a width. In view of the above effects, as shown in FIG. 11 and FIG. 12, to dispose columns to control the cell thickness in the column structure, the spacer is preferably disposed in a zigzag or random pattern or has a wall structure.

The spacer columns for controlling the gap may be disposed along the seal area, and as the case may be, disposition may be made so that when the sealing agent is spread, the spacer columns and the sealing agent are contacted at the left in FIG. 12. This structure is particularly effective to achieve a liquid crystal display device which is formed by connecting a plurality of liquid crystal display panels. And, the cell thickness controlling material as column may be an organic member or an inorganic member.

In this case, when the liquid crystal panel has a small size, the spacer is not needed to be disposed in the image display area, because warp of the substrate is not required to be taken into account so carefully when the panel size is small.

If the panel size is small to 2 inches or below, such as a liquid crystal display device for a projector which has a small pixel size for high resolution, possibility that display quality is degraded is increased due to a thick cell member in the image display area, so that it is desirable to form only in the peripheral area outside the effective display area.

But, the spacer may be disposed simultaneously or separately regardless of the liquid crystal panel size. And, the spacer in the display area may either a silica spacer or a plastic spacer.

When the liquid crystal cell is formed with the opposed substrate formed larger than the substrate with the switching matrix or when the liquid crystal cell is formed simultaneously with a substrate having a plurality of opposed substrates in the same size with a single substrate having a plurality of arrays formed thereon, the spacer columns may also be formed in a portion where the liquid crystal is not filled on the outer periphery of the seal area of a finally formed liquid crystal panel, and such a portion may be separated in the final production step.

As described above, the present invention can keep the gap constant between the electrode substrates without damaging the drive circuit of an integral liquid crystal display panel which has the drive element and the drive circuit formed of the p-Si TFT on the substrate, and also can decrease the frame area. Therefore, the liquid crystal device can be made small and lightweight and can be applied for a small device such as a portable information terminal. Besides, since a yield in forming the liquid crystal cell can be improved, the device can be made inexpensive.

What is claimed is:

1. A liquid crystal device comprising:

a first substrate;

a second substrate positioned opposed to said first substrate with a gap between said first and second substrates, said second substrate including on a surface thereof a seal area, an area with an image display area having a plurality of pixel electrodes disposed in the image display area and a display outside area located between the seal area and the image display area;

a sealing member disposed in the seal area for fixing said first substrate to said second substrate;

a liquid crystal layer held between said first and second substrates;

driving elements connected to the pixel electrodes disposed in the image display area;

a drive circuit for driving the driving elements disposed in at least said seal area; and a plurality of first spacer members and second spacer members arranged around said drive circuit to provide an even cell thickness across the liquid crystal device; said plurality of first spacer members being disposed in the display outside area and said second spacer members being disposed in the image display area, wherein an area of said first spacer members facing the surface of said second substrate per unit area of the image display area is different from an area of said second spacer members facing the surface of said second substrate per unit area of the display outside area, and no member for maintaining the gap between said first and second substrates is disposed on said driver circuit.

2. The liquid crystal display device as set forth in claim 1, wherein one of said first spacer members is disposed in the form of a strip along the display outside area.

3. The liquid crystal display device as set forth in claim 1, wherein one of said first spacer members is in contact with the sealing means.

4. The liquid crystal display device as set forth in claim 1, wherein at least one of said first and second substrates has a shielding area in the image display area, and wherein said second spacer members in the image display area are selectively disposed in the shielding area.

5. The liquid crystal display device as set forth in claim 4, wherein the first spacer members are formed of at least one of column, prism and stripe shapes or combination thereof.

6. The liquid crystal display device as set forth in claim 1, wherein at least first and second spacer members are made of transparent member.

7. The liquid crystal display device as set forth in claim 1, wherein at least first and second spacer members are formed of multilayered colored layers.

8. The liquid crystal display device as set forth in claim 1, wherein a number of said first spacer members is different from a number of said second spacer members so as to rigidly reinforce the image display area against bending.

9. The liquid crystal display device as set forth in claim 1, wherein said first and second spacer members are fixed to at least one of said first and second substrate.

10. The liquid crystal display device as set forth in claim 9, wherein the area of said first spacer members facing said surface of the second substrate per unit area of the image display area is greater than the area of said second spacer members facing the surface of said second substrate per unit area of the outside display area.

11. The liquid crystal display device as set forth in claim 9, wherein a number of said first spacer members is greater than a number of said second spacer members.

* * * * *